US005435194A

United States Patent [19]

Schedrat et al.

[11] Patent Number: 5,435,194

[45] Date of Patent: Jul. 25, 1995

[54] ARRANGEMENT OF MEASURING DEVICES ON A SEMITRAILER MOTOR VEHICLE

[75] Inventors: Kurt Schedrat, Gaienhofen; Lothar Jakob, Blumberg; Dirk Engels, Tengen, all of Germany

[73] Assignee: Georg Fischer Verkehrstechnik GmbH, Singen, Germany

[21] Appl. No.: 197,213

[22] Filed: Feb. 16, 1994

[30] Foreign Application Priority Data

Feb. 17, 1993 [CH] Switzerland .......................... 492/93

[51] Int. Cl.$^6$ ................................................ G01L 5/13

[52] U.S. Cl. .................................. 73/862.57; 280/504

[58] Field of Search .................. 73/865.8, 862.57, 768, 73/767, 781

[56] References Cited

U.S. PATENT DOCUMENTS

| | | | |
|---|---|---|---|
| 3,780,817 | 12/1973 | Videon | 73/767 |
| 4,405,146 | 9/1983 | Mitchell | 280/432 |
| 4,477,100 | 10/1984 | Elyakim | 280/434 |
| 4,702,488 | 10/1987 | Baillie | 280/426 |
| 5,026,085 | 6/1991 | Ducote | 280/426 |
| 5,060,965 | 10/1991 | Haefner et al. | 280/504 |
| 5,152,544 | 10/1992 | Dierker, Jr. et al. | 280/432 |
| 5,230,392 | 7/1993 | Tremblay | 177/137 |
| 5,294,143 | 3/1994 | Järvinen | 280/425.1 |

*Primary Examiner*—Richard E. Chilcot, Jr.
*Assistant Examiner*—James M. Olsen
*Attorney, Agent, or Firm*—Bachman & LaPointe

[57] ABSTRACT

The present invention relates to an arrangement of measuring devices on a semitrailer motor vehicle having a tractive unit, a semitrailer unit and a fifth wheel fastened to the tractive unit. The fifth wheel has a coupling plate which is pivotally disposed on a support structure such as a support block. The measuring arrangement includes measuring devices for measuring acceleration, tractive or braking forces which arise in the fifth wheel of the tractive unit. In the various embodiments disclosed herein, the measuring devices are incorporated into the support structure. If desired, the measuring devices may also include devices for effecting measurement of the weight of the semitrailer. The measured values are converted in an evaluation device into appropriate control commands for influencing the driving behavior of the semitrailer motor vehicle.

10 Claims, 2 Drawing Sheets

ARRANGEMENT OF MEASURING DEVICES ON A SEMITRAILER MOTOR VEHICLE

BACKGROUND OF THE INVENTION

The present invention relates to an arrangement of measuring devices on a support structure for a fifth wheel of a semitrailer motor vehicle for influencing and improving the driving behavior of the vehicle.

It is a known practice to provide semitrailer motor vehicles having a fifth wheel with measuring devices for measuring the wear on certain parts. This is done so that reliable operation may be guaranteed through early replacement of worn parts.

From a safety standpoint, it is desirable to measure the forces which arise between the semitrailer and the tractive unit as part of an effort to influence and improve the driving behavior of the vehicle.

Accordingly, it is a principal object of the present invention to provide an arrangement of measuring devices by means of which an influencing and improvement of the driving behavior of a semitrailer motor vehicle can be achieved for different loads.

Further objects and advantages of the present invention will appear hereinbelow.

SUMMARY OF THE INVENTION

The present invention relates to an arrangement of measuring devices on a support structure for a fifth wheel of a semitrailer motor vehicle having a tractive unit and a semitrailer for influencing and improving the driving behavior of the vehicle.

In accordance with the present invention, the fifth wheel has a coupling plate which is pivotally mounted to a support structure. The measuring arrangement comprises means for measuring forces arising between the semitrailer and the tractive unit. The measuring means are disposed on or mounted to at least one part of the support structure for the coupling plate. In a first embodiment of the present invention, the measuring means comprise strain gauges which are disposed within and mounted to a supporting part of the coupling plate. In a second embodiment of the present invention, the support structure comprises a support block and the measuring means are disposed on the support block. In yet another embodiment of the present invention, the support structure includes a support block, a pin, and at least one resilient element having a known spring characteristic disposed in the support block. In this embodiment, the measuring means comprise at least one displacement sensor for measuring the positional change between the support block and the pin. Still other measuring arrangement embodiments set out herein include an arrangement wherein the measuring means measure the displacement of a support part and an arrangement wherein the measuring means measure the deformation of a portion of the support structure. The details of all of these embodiments are set out in the following description and the accompanying drawings. The specific arrangements of the measuring devices of the present invention set out herein are superior to measuring device arrangements heretofore known.

DETAILED DESCRIPTION

As previously mentioned, the present invention relates to an arrangement of measuring devices for use on a semitrailer motor vehicle having a tractive unit, a semitrailer and a fifth wheel connected to the tractive unit. Typically, the semitrailer is connected to the tractive unit by the cooperation of a kingpin attached to the semitrailer and the fifth wheel. During operation of the vehicle, forces arise between the semitrailer and the tractive unit which affect the driving behavior of the vehicle. The measuring device arrangements of the present invention are intended to measure these forces and use the measured values to influence and improve the driving behavior of the vehicle.

Figure 1:
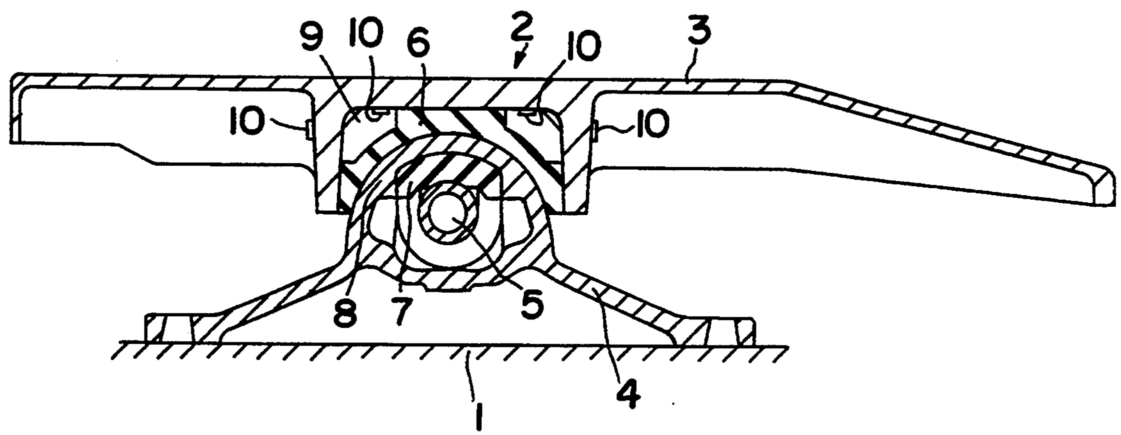
FIG. 1 is a sectional view of a first support structure for a fifth wheel with a first arrangement of measuring devices incorporated therein.

Referring now to the drawings, FIG. 1 shows a fifth wheel 2 disposed on a tractive unit 1 of a semitrailer motor vehicle having a semitrailer unit (not shown). The fifth wheel has a coupling plate 3 which is pivotally mounted on at least one support block 4. The coupling plate 3 is supported by means of a pin 5 in each support block 4 and is additionally supported by elastic supporting elements 6, 7 made of an elastomer or rubber material. The supporting elements 6, 7 are disposed on or mounted to a supporting portion 8 of each support block 4. The coupling plate 3 has a support pocket 9 for receiving the supporting element 6.

Measuring devices 10 are disposed on inner and/or outer walls of the support pocket 9. The measuring devices are used to measure the forces which act upon the coupling plate as a result of the operation of the vehicle. While the measuring devices 10 may be any suitable measuring device known in the art, they are preferably strain gauges.

The forces which act upon the coupling plate arise as a result of the tractive force applied to and the acceleration or braking of the semitrailer motor vehicle as well as the weight of the semitrailer. The measured values are supplied to an evaluation device (not shown) for conversion into appropriate control commands for influencing the driving behavior of the semitrailer motor vehicle.

Figure 2:
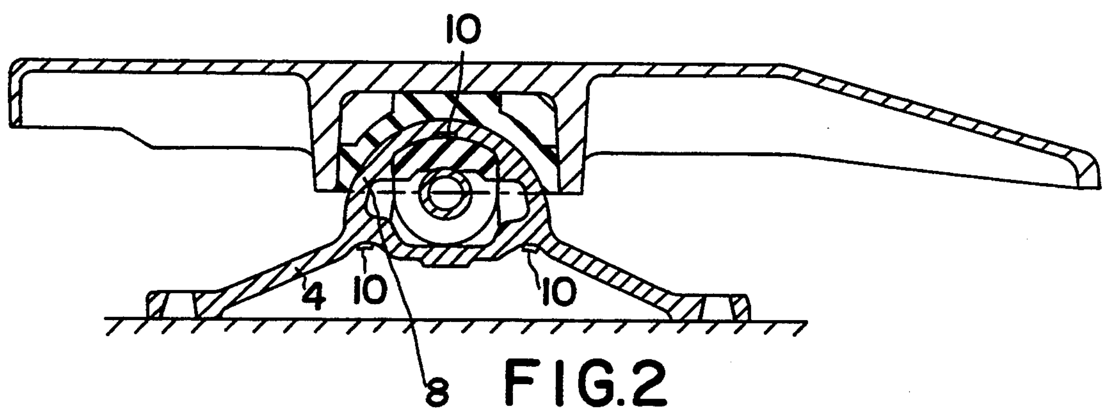
FIG. 2 illustrates an alternative embodiment of a measuring arrangement for the support structure of FIG. 1.

In the embodiment shown in FIG. 2, the measuring devices 10, preferably in the form of strain gauges, are disposed on the support block 4. As shown in this figure, at least one measuring device 10 is disposed on a supporting portion 8 of the support block 4.

Figure 3:
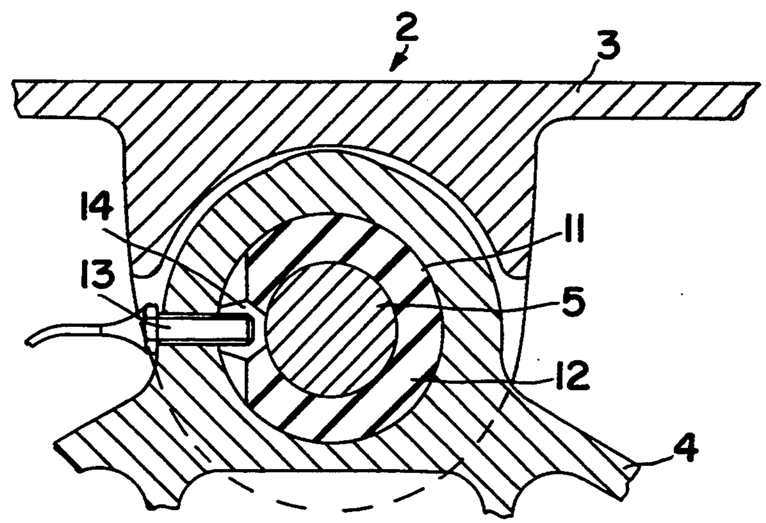
FIG. 3 is a sectional view of an alternative support structure for a fifth wheel with an alternative arrangement of measuring devices.

FIG. 3 shows another arrangement of measuring devices for another type of support structure. In this type of support structure, the coupling plate 3 is seated on a support block 4 and is supported by a pin 5 in the support block 4. An elastomeric or rubber element 12, whose spring characteristic is known, is disposed between the pin 5 and a wall of a bore 11 in the support block 4. In this embodiment, at least one measuring device 13 is provided through an opening in the support block and fastened thereto. Preferably, the measuring device(s) 13 are in the form of displacement sensor(s). The displacement sensor(s) may be any suitable displacement sensor known in the art. Preferably measuring devices 13 extend through a recess 14 in the elastomeric or rubber element 12 to a location substantially adjacent the pin 5.

As a result of forces acting upon the fifth wheel 2, the pin 5 is displaced in the elastomeric or rubber element 12. The distance that the pin is displaced is measured by the displacement sensor(s) 13. The measured values are supplied to an evaluation device (not shown) where they are converted into control commands for influencing the driving behavior of the semitrailer motor vehicle. By virtue of the known spring characteristic of the element 12 and the measured displacement distance, the forces acting upon the pin 5 may be calculated.

Beside the horizontal displacement sensor arrangement shown in FIG. 3, additional displacement sensors (not shown) may be disposed in a vertical direction so that positional changes of the pin 5 may be measured in all directions. The presence of the additional displacement sensors allow the weight of the semitrailer to be determined.

Figure 4:
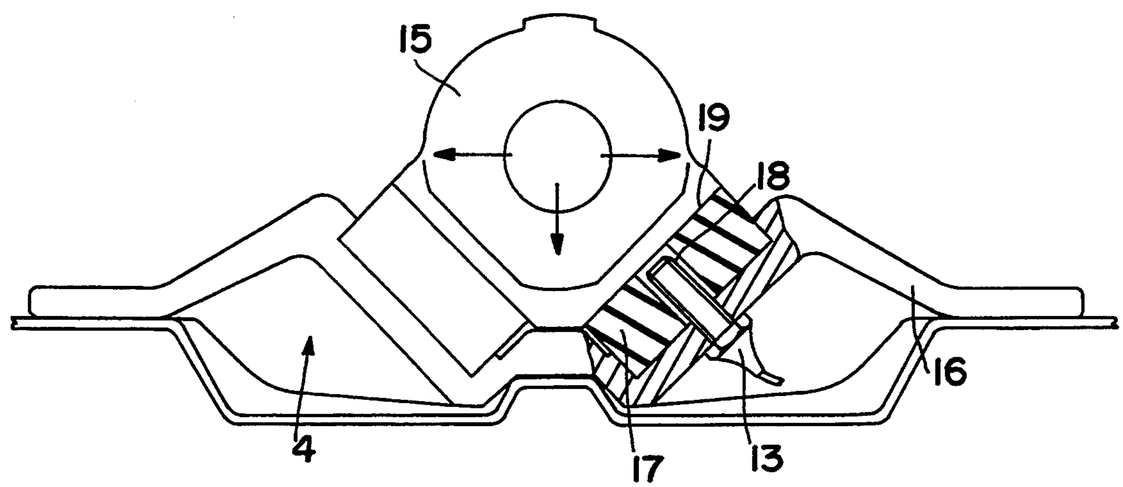
FIG. 4 is a side view, partially in section, of an alternative embodiment of a support structure for a fifth wheel and an alternative measuring device arrangement to be used therein.

In the embodiment shown in FIG. 4, the support structure for the coupling plate includes a support block 4 having a bearing part 15 and a fastening part 16. The parts 15 and 16 are connected to one another via elastomeric or rubber elements 17 having a known spring characteristic. Preferably, there are two elements 17, each at an angle of 45° with respect to a horizontal plane passing through the fastening part 16. Measuring devices 13, which may be any suitable measuring device known in the art, are mounted to the fastening part 16 so that they extend through an opening 18 in each of the elastic elements 17 to a location substantially adjacent a support plane 19 of the bearing part 15. Preferably, the measuring devices 13 are displacement sensors for measuring the displacement of the bearing part.

Horizontal and vertical forces acting upon the bearing part 15 as a result of forces acting on the fifth wheel and the coupling plate are calculated by the evaluation device (not shown) using the measurement of the bearing part displacement distance by the displacement sensors 13 and the known spring characteristics of the elastic elements 17. The measured values are converted into control commands for influencing the driving behavior of the semitrailer motor vehicle.

Figure 5:
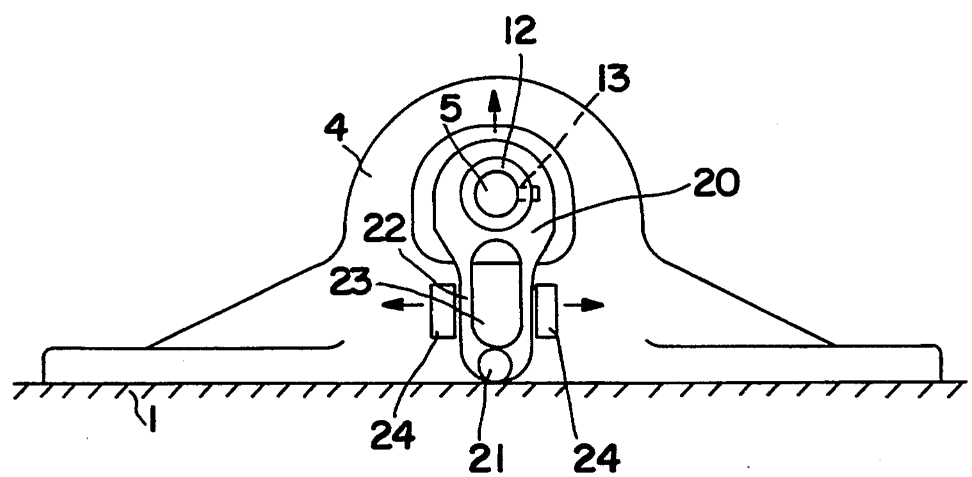
FIG. 5 is a side view of still another alternative embodiment of a support structure for a fifth wheel and an alternative measuring device arrangement to be used therewith.

FIG. 5 shows yet a further support structure for a coupling plate and an alternative arrangement of measuring devices thereon. In this embodiment, the pin 5 connected to the coupling plate is supported by an elastomeric or rubber element 12 as in FIG. 3. A lever 20 is connected at one end to the pin 5 so as to be capable of swivelling. The other end of the lever 20 is connected to the bearing block 4, or alternatively directly to the tractive unit 1, so as to be capable of swivelling about an axle pin 21.

The lever 20 has two deformable or resilient webs 22 and a recess 23 therebetween. The webs have a calculable spring characteristic. Upon vertical movement of the pin 5, which movement may be caused by the weight of the semitrailer or vertical forces, the webs 22 are deformed or bent outwardly or inwardly. The extent of the web deformation is measured by measuring devices 24 disposed on the support block 4 adjacent the resilient webs. Preferably, the measuring devices are displacement sensors. Any suitable displacement sensor known in the art may be used for the measuring devices. By virtue of the calculable spring characteristic of the webs 22, it is possible by measuring the web deformation to determine the force acting vertically upon the pin 5. Horizontal forces acting on the pin may be determined in the manner described with reference to FIG. 3 by measuring devices 13. The measured forces are transmitted to an evaluation device (not shown) for conversion into appropriate control commands for influencing the driving behavior of the semitrailer motor vehicle.

Alternatively, the measuring devices 24 may be replaced by strain gauges disposed on the webs 22 of the lever 20. The strain gauges may be used to determine the forces acting on the pin.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An arrangement of measuring devices on a fifth wheel of a semitrailer motor vehicle having a semitrailer and a tractive unit, said fifth wheel having a coupling plate pivotally disposed on a support structure, said measuring arrangement comprising means for measuring forces arising between the semitrailer and the tractive unit, said measuring means being disposed on at least one part of the supporting structure for the coupling plate, wherein said support structure includes a support block and a bearing pocket associated with said coupling plate and said measuring means comprises strain gauges mounted within said bearing pocket and strain gauges disposed on at least one outer wall of said bearing pocket.

2. An arrangement of measuring devices on a fifth wheel of a semitrailer motor vehicle having a semitrailer and a tractive unit, said fifth wheel having a coupling plate pivotally disposed on a support structure, said measuring arrangement comprising means for measuring forces arising between the semitrailer and the tractive unit, said measuring means being disposed on at least one part of the supporting structure for the coupling plate wherein said support structure includes a support block and a bearing pocket associated with said coupling plate and said measuring means comprises strain gauges disposed on the support block.

3. An arrangement according to claim 2 wherein the measuring means comprise strain gauges and said strain gauges are disposed in the region of a supporting portion of the support block.

4. An arrangement according to claim 2 wherein said support structure further comprises a pin and at least one resilient element having a known spring characteristic, said at least one resilient element being disposed in the support block between the support block and pin and said measuring means comprising at least one displacement sensor for measuring a positional change between said support block and said pin.

5. An arrangement according to claim 2 further comprising said measuring means being disposed between a bearing part associated with the coupling plate and a fastening part of the support block.

6. An arrangement according to claim 5 further comprising at least one resilient element with a known spring characteristic disposed between the bearing part and the fastening part and said measuring means comprising displacement sensors for measuring a positional change of the bearing part.

7. An arrangement of measuring devices on a fifth wheel of a semitrailer motor vehicle having a semitrailer and a tractive unit, said fifth wheel having a coupling plate pivotally disposed on a support structure, said measuring arrangement comprising means for measuring forces arising between the semitrailer and the tractive unit, said measuring means being disposed on at least one part of the supporting structure for the coupling plate wherein said support structure further comprises a pin and at least one resilient element having a known spring characteristic, said at least one resilient element being disposed in the support block between the support block and pin and said measuring means comprising at least one displacement sensor for measuring a positional change between said support block and said pin.

8. An arrangement according to claim 6 wherein said at least one resilient element is formed by at least one of an elastomeric element and a rubber element.

9. An arrangement according to claim 7 wherein said support structure further comprises a lever having resilient webs disposed between the pin and an axle pin connected to at least one of the support block and the semitrailer motor vehicle and said measuring means further comprising measuring devices being disposed adjacent the resilient webs for measuring the deformation of the webs.

10. An arrangement of measuring devices on a fifth wheel of a semitrailer motor vehicle having a semitrailer and a tractive unit, said fifth wheel having a coupling plate pivotally disposed on a support structure, said measuring arrangement comprising means for measuring forces arising between the semitrailer and the tractive unit, said measuring means being disposed on at least one part of the supporting structure for the coupling plate wherein said support structure further comprises a lever having resilient webs disposed between the pin and an axle pin connected to at least one of the support block and the semitrailer motor vehicle and said measuring means further comprising measuring devices being disposed adjacent the resilient webs for measuring the deformation of the webs.

* * * * *